US005425518A

United States Patent [19]

Czerniak

[11] Patent Number: 5,425,518

[45] Date of Patent: Jun. 20, 1995

[54] CORD/WIRE HOLDER

[76] Inventor: John Czerniak, P.O. Box 895, Cochrane, Alberta, Canada, T0L 0W0

[21] Appl. No.: 208,560

[22] Filed: Mar. 10, 1994

[51] Int. Cl.$^{6}$ .................................... F16L 3/10

[52] U.S. Cl. .................................... 248/67.5; 24/130; 174/72 A

[58] Field of Search .................... 248/67.5, 67.7, 74.1, 248/74.5, 65, 49, 51, 314, 316.8; 24/115 M, 130, 132 WL; 174/72 A, 135, 161 F, 163 F, 158 F

[56] References Cited

U.S. PATENT DOCUMENTS

| | | | |
|---|---|---|---|
| 794,570 | 7/1905 | Tompkins | 24/130 |
| 828,765 | 8/1906 | Nilsson | 24/130 |
| 4,588,153 | 5/1986 | Boston et al. | 248/74.2 |
| 4,852,832 | 8/1989 | Delaney | 248/65 |

*Primary Examiner*—Ramon O. Ramirez
*Attorney, Agent, or Firm*—George H. Dunsmuir

[57] ABSTRACT

Strings of Christmas lights are usually suspended from nails or hooks which are often formed of metals which corrode when exposed to the atmosphere. A simple cord or wire holder for use with the strings of lights includes a flat base with holes for receiving fasteners for mounting the holder on a fascia board or window or door frame; and a cylindrical body extending outwardly from the base, the body having an inclined first slot communicating with a second slot of inverted V-shaped cross section which is parallel to the longitudinal axis of the body, whereby a wire can be inserted through the first slot into the second slot, the inverted V-shape inhibiting longitudinal shifting of such wire.

3 Claims, 3 Drawing Sheets

CORD/WIRE HOLDER

BRIEF SUMMARY OF THE INVENTION

This invention relates to a cord or wire holder.

More specifically, the invention relates to a Christmas tree wire holder of the type used on the exterior of a dwelling or other building for holding a string of lights. Obviously, the device can be used to hold other wires or cords.

The usual practice when hanging a string of outdoor lights is to hammer nails or hooks into the fascia or soffit of the caves or into a window or door frame, and suspend the wires from the nails or hooks. Unfortunately, the nails or hooks often corrode, and quickly become unsightly. Moreover, the nails or hooks do not prevent or impede longitudinal movement of the wire, and consequently movement of the string can and does occur.

BACKGROUND OF THE INVENTION

A review of the patented literature discloses a variety of hook devices for cords or wires. Examples of such devices are found in Canadian Patents Nos. 868,776 which issued to G. MacDonald on Apr. 20, 1971; 969,158, which issued to D. E. Thiry on Jun. 10, 1975; 1,030,133, which issued to R. MacRae on Apr. 25, 1978; 1,086,289, which issued to J. R. Llauge on Sep. 23, 1980 and 1,158,843, which issued to J. G. Beaudette on Dec. 20, 1983, and U.S. Pat. Nos. 2,043,716, which issued to J. J. Sloan on Jun. 9, 1936 and 2,626,438, which issued to G. R. Powell on Jan. 27, 1953. Most such devices are somewhat complicated, expensive to manufacture and/or formed of metal which is subject to corrosion. In other words, while the patented devices may perform in a satisfactory manner, they do not necessarily provide a reasonable solution to the problems presented by the use of nails.

The object of the present invention is to provide a solution to the problems described above in the form of a relatively simple wire or cord holder which is easy to install and use, and which can readily be produced from material which does not corrode when exposed to air.

Accordingly, the present invention relates to a cord or wire holder comprising base means for mounting the holder on a supporting surface; body means extending outwardly from said base means; first slot means in said body means for receiving a cord or wire; and second slot means at the inner end of and at an angle to said first slot means permitting wedging the cord or wire in a fixed position in the holder.

BRIEF DESCRIPTION OF THE DRAWINGS

The invention will be described with reference to the accompanying drawings of preferred embodiments of the invention, and wherein.

DESCRIPTION OF THE PREFERRED EMBODIMENT

Figure 1:
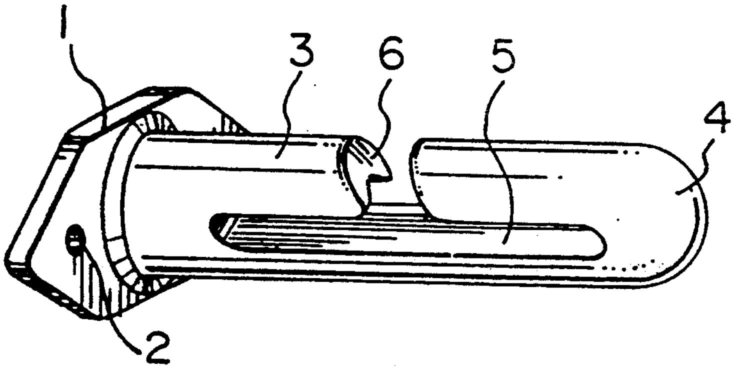
FIG. 1 is a perspective view from one side and above of a wire holder in accordance with the present invention.
Figure 2:
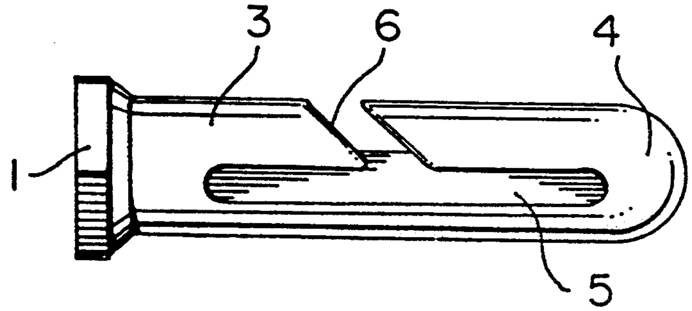
FIG. 2 is a side elevation view of the holder of FIG. 1.
Figure 3:
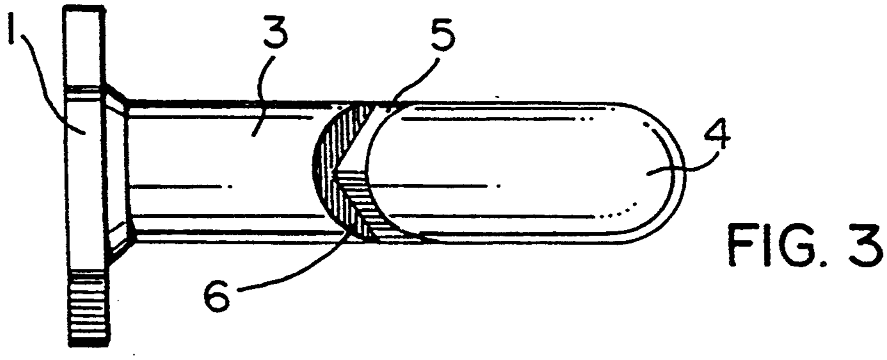
FIG. 3 is a plan view of the holder of FIGS. 1 and 2.
Figure 4:
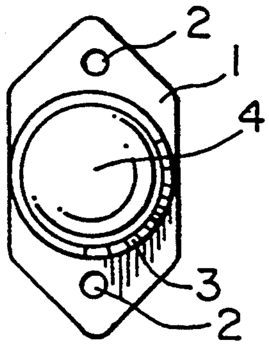
FIG. 4 is a front end view of the holder of FIGS. 1 to 3.
Figure 5:
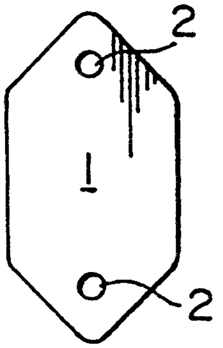
FIG. 5 is a rear end view of the holder of FIGS. 1 to 4.

Referring to FIGS. 1 to 5, one embodiment of the holder of the present invent, ion includes a thin, planar, hexagonal baseplate 1 with holes 2 near each end thereof for receiving screws (not shown). The baseplate 1 is used to mount the holder on a fascia or fascia board of a dwelling or other building. A cylindrical rod-like body 3 with a hemispherical outer free end 4 extends outwardly from the center of the baseplate 1. A slot 5 extends longitudinally of the body 1 from one side to the opposite side there. The slot 5 is an inverted V-shape in cross section, but may also be V-shaped in cross section. The slot 5 is intersected by another slot 67, which is inclined with respect to the vertical, sloping downwardly and outwardly from the top surface of the body in a direction away from the baseplate 1 to the top of the slot 5.

Figure 6:
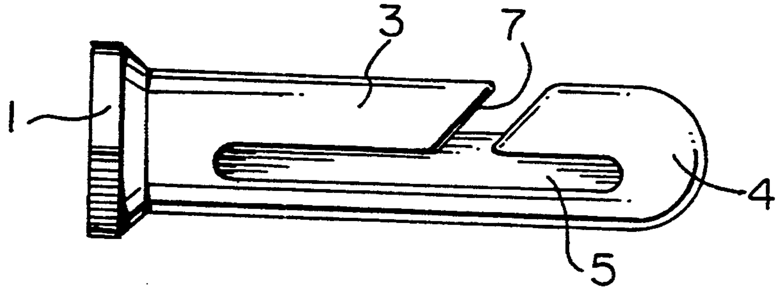
FIG. 6 is a side elevation view of a second embodiment of the holder of the present invention.

In a second embodiment of the holder (FIG. 6) the slot 6 is repaced by a slot 7 sloping downwardly and inwardly from the top surface of the body in a direction generally towards the baseplate 1. Otherwise, the first two embodiments of the invention are identical.

Figure 7:
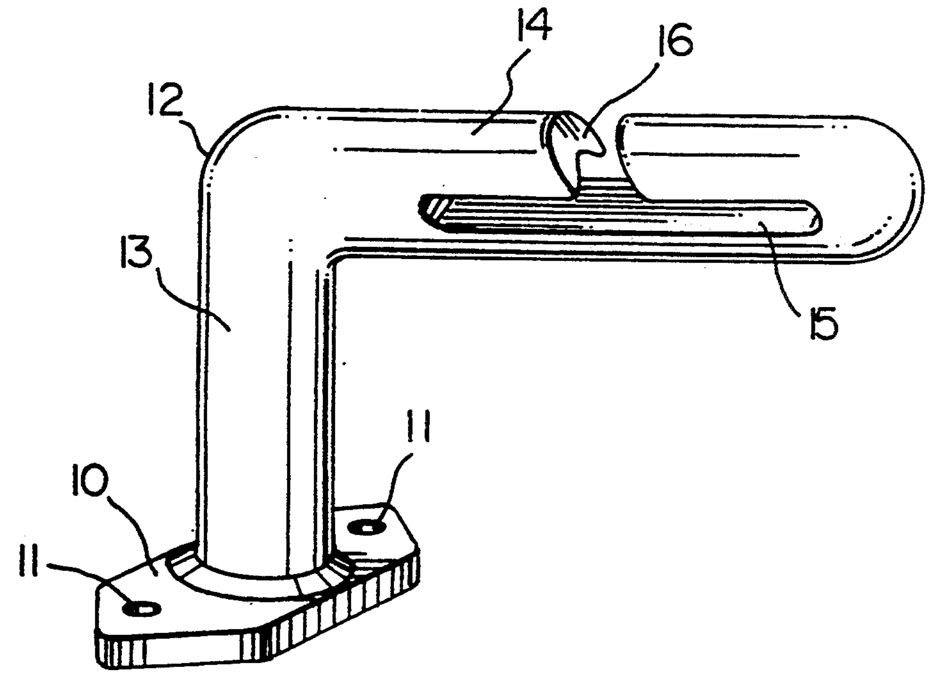
FIG. 7 is a perspective view of a third embodiment of the holder in accordance with the invention.
Figure 8:
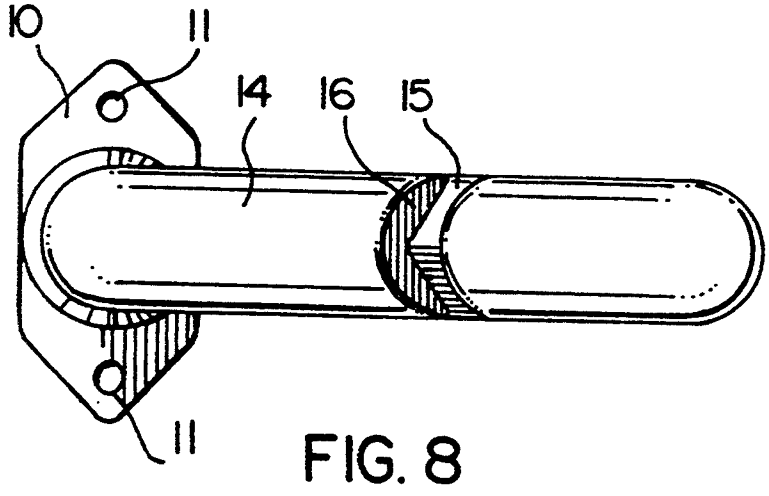
FIG. 8 is a plan view of the holder of FIG. 7.

With reference to FIGS. 7 and 8, an embodiment of the invention for use on a horizontal supporting surface, e.g. a railing or window sill, includes a baseplate 10 similar to the baseplate 1. Holes 11 in the baseplate 10 receive fasteners for connecting the holder to the supporting surface. A generally L-shaped body 12 extends upwardly and outwardly from the baseplate 10. The body 12 includes a vertical post 13 and a horizontal arm 14 integral with the post 13. The horizontal arm 14 contains slots 15 and 16 similar to the slots 5 and 6, respectively of the first embodiment of the invention described above.

Figure 9:
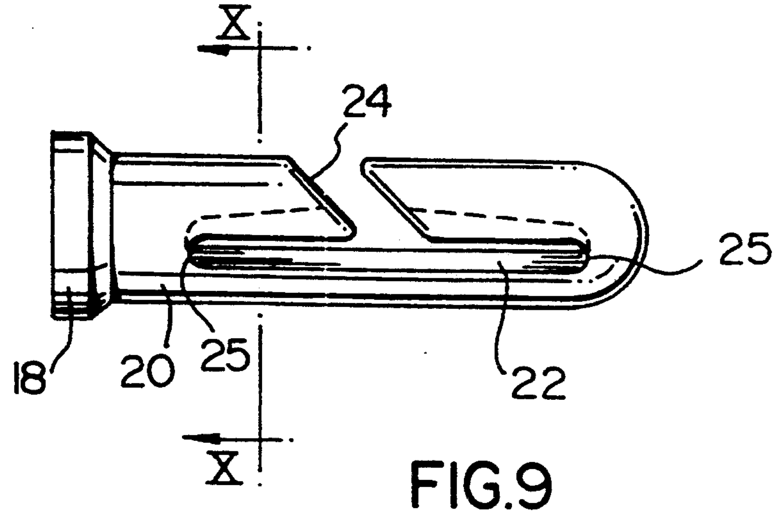
FIG. 9 is a side elevation view of a fourth embodiment of the holder of the present invention.
Figure 10:
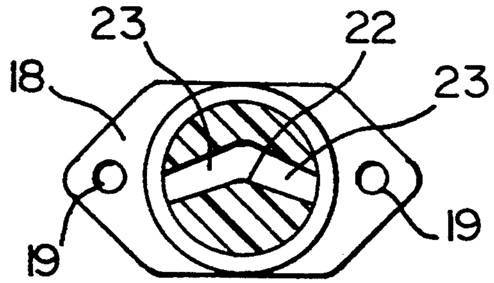
FIG. 10 is a cross section taken generally along X—X of FIG. 9.

A fourth embodiment of the invention which is shown in FIGS. 9 and 10 is basically similar to the device of FIGS. 1 to 6. The holder of FIGS. 9 and 10 includes a planar, hexagonal baseplate 18 with holes 19 for receiving fasteners (not shown). A cylindrical body 20 extends outwardly from the plate 18. A longitudinally extending slot 22 is provided in the body 20. The slot 22 has an inverted V-shaped cross section, each side 23 thereof tapering outwardly from the centre of the slot. Moreover, the slot 22 tapers longitudinally from approximately the center thereof where it is intersected by an inclined top slot 24 towards each end 25.

In use, a plurality of holders are mounted on a building, e.g. on fascia boards, window frames or door frames at spaced apart locations (such as twelve to twenty-four inches apart). A Christmas tree light wire is slid into each slot 6, 7, 16 or 24, and then pushed or pulled into the longitudinally extending slot 5, 15 or 22. In all embodiments, the V or inverted V-shaped cross section of the slot 5, 15 or 22 serves to prevent longitudinal movement of the wire between holders. In the fourth embodiment of the invention (FIGS. 9 and 10), the tapering slot 22 performs a wedging action on the wire to restrict movement even further.

Thus, there has been described a relatively simple cord or wire holder, which can be formed of plastic, and which is easy to use.

I claim:

1. A cord or wire holder comprising base means for mounting the holder on a supporting surface; body means extending outwardly from said base means; first slot means in said body means for receiving a cord or wire; and second slot means at an inner end of and at an angle to said first slot means permitting wedging the cord or wire in a fixed position in the holder; rod means extending outwardly from said base means defining said body means, said first slot means being inclined with respect to the longitudinal axis of said rod means, and said second slot means being parallel to the longitudinal axis of said rod means.

2. A holder according to claim 1, wherein said second slot means has an inverted V-shaped cross-section, said first slot means intersecting said second slot means approximately at the longitudinal center thereof.

3. A cord or wire holder comprising base means for mounting the holder on a supporting surface; body means extending outwardly from said base means; first slot means in said body means for receiving a cord or wire; and second slot means at an inner end of and at an angle to said first slot means permitting wedging the cord or wire in a fixed position in the holder; wherein said second slot means is elongated with an inverted V-shaped cross-section, said second slot means having a base parallel to a longitudinal axis of said body means, and the top of said second slot means being inclined longitudinally downwardly and away from each edge of said first slot means.

* * * * *